Patented July 14, 1953

2,645,653

UNITED STATES PATENT OFFICE 2,645,653

ALKALI METAL SALTS OF A COBALT COMPLEX OF ETHYLENE-BISIMINO-DIACETIC ACID

Werner Zerweck and Max Schubert, Frankfurt am Main Fechenheim, Germany, assignors to Cassella Farbwerke Mainkur Aktiengesellschaft, Frankfurt am Main Fechenheim, Germany, a company of Germany No Drawing. Application February 20, 1951, Serial No. 211,979. In Germany March 6, 1950

1 Claim. (Cl. 260—439)

This invention relates to new therapeuticals containing cobalt.

These new compounds correspond probably to the formula:

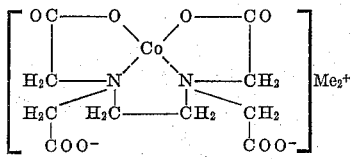

wherein Me means an alkali metal.

These compounds may be prepared by converting ethylene-bisimino-diacetic acid by means of a cobalt salt into the complex cobalt compounds.

The complex cobalt compounds being object of this invention are distinguished, in comparison with known cobalt salts used for improving the formation of human blood (see "Deutsche Medizinische Wochenschrift," 1950, 3, 116 ff.), by their lack of toxicity and good compatibility.

The following examples illustrate the invention but are not intended to limit it thereto, the parts being by weight:

Example 1

To a solution of 291 parts of cobaltous nitrate

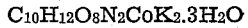

in about 1500 parts of water there are added while stirring 2 moles of a 10 n solution of potassium hydroxide. The precipitated cobaltous hydroxide is filtered by suction until the nitrate reaction is negative. From the paste thus obtained a suspension is formed with 2000 parts of water and this suspension is stirred with 292 parts of ethylene-bisimino-diacetic acid. 2 moles of a 10 n solution of potassium hydroxide are then allowed to flow in, whereby a limpid violet solution is formed.

In order to isolate the salt, the solution is concentrated by vacuum evaporation to a volume of about 750 parts and an equal portion of methanol is added under stirring. A crystalline mass is thus formed, consisting of slightly rose-colored laminae, which is filtered by suction, washed with methanol and dried at 60–70° C. According to an elementary analysis the product is of the following composition:

$$C_{10}H_{12}O_8N_2CoK_2.3H_2O$$

Example 2

A solution of 238 parts of cobalt chloride

in 1500 parts of water is heated to 70° C. and a 10% solution of sodium carbonate is allowed to flow to it until an alkaline reaction is obtained. The precipitated cobalt carbonate is allowed to react with ethylene-bisimino-diacetic acid and 2 moles of caustic soda lye in an analogous manner as described in Example 1. After working it up in exactly the same way, the complex cobalt-disodium salt is obtained in form of slightly violet-colored laminae having the formula:

$$C_{10}H_{12}O_8N_2CoNa_2.3H_2O$$

We claim:

As new compounds the complex cobalt compounds of ethylene-bisimino-diacetic acid corresponding to the formula:

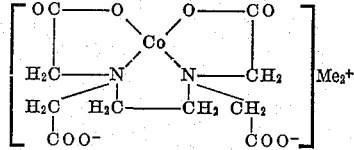

(wherein Me means an alkali metal), which compounds are distinguished by their lack of toxicity and their good compatibility.

WERNER ZERWECK.
MAX SCHUBERT.

References Cited in the file of this patent

Schwarzenbach—Helvetica Chimica Acta, vol. 32, page 848, May 1949.

Brintzinger et al.—Zeitschrift fur Anorganische and Allgemeine Chemie, vol. 251, pages 285–294 (1943).

Pfeiffer et al.—Ber. vol. 76, pages 847–855.